United States Patent [19]

Müller et al.

[11] 4,360,617
[45] Nov. 23, 1982

[54] STABILIZER SYSTEMS OF TRIARYLPHOSPHITES AND PHENOLS

[75] Inventors: Helmut Müller, Binningen; Kurt Schwarzenbach, Pfeffingen, both of Switzerland

[73] Assignee: Ciba-Geigy Corporation, Ardsley, N.Y.

[21] Appl. No.: 237,041

[22] Filed: Feb. 23, 1981

Related U.S. Application Data

[63] Continuation of Ser. No. 112,772, Jan. 17, 1980, abandoned, which is a continuation of Ser. No. 904,917, May 3, 1978, abandoned, which is a continuation of Ser. No. 762,918, Jan. 27, 1977, abandoned.

[30] Foreign Application Priority Data

Feb. 5, 1976 [CH] Switzerland .......................... 1410/76

[51] Int. Cl.³ .............................................. C08K 5/52
[52] U.S. Cl. .................................... 524/101; 524/151
[58] Field of Search ............ 260/45.7 PH, 45.8, 45.95, 260/45.85

[56] References Cited

U.S. PATENT DOCUMENTS

| | | | |
|---|---|---|---|
| 2,493,597 | 1/1950 | Rothrock et al. .................. | 260/45.7 |
| 2,867,594 | 1/1959 | Hansen et al. .................. | 260/23 XA |
| 2,915,496 | 12/1959 | Swart et al. ........................ | 260/45.7 |
| 2,997,454 | 8/1961 | Leistner et al. .................... | 260/45.8 |
| 3,039,993 | 6/1962 | Friedman ........................... | 260/45.8 |
| 3,080,338 | 3/1963 | Nudenberg et al. .............. | 260/45.7 |
| 3,305,520 | 2/1967 | Fritz et al. ........................ | 260/45.7 |
| 3,409,857 | 11/1968 | Mills ................................. | 260/45.95 |
| 3,489,702 | 1/1970 | Abramoff ............................. | 260/18 |
| 3,531,483 | 9/1970 | Gilles ................................. | 260/45.8 |
| 3,558,554 | 1/1971 | Kuriyama et al. .............. | 260/45.85 |
| 3,584,047 | 6/1971 | Dexter et al. ...................... | 260/559 |
| 3,595,936 | 7/1971 | Birenavige et al. ................ | 260/857 |
| 3,658,743 | 4/1972 | Bevilacqua ..................... | 260/23.5 A |
| 3,677,965 | 7/1972 | Dexter et al. ...................... | 260/45.9 |
| 3,756,906 | 9/1973 | Leyland et al. ..................... | 161/231 |
| 3,886,114 | 5/1975 | Beadle ................................ | 260/45.7 |
| 3,945,967 | 3/1976 | Jaquiss ............................... | 260/45.8 |
| 3,960,758 | 6/1976 | Witte et al. ........................ | 260/45.7 |
| 4,013,619 | 3/1977 | Schmidt ............................ | 260/340.7 |
| 4,187,212 | 2/1980 | Zinke et al. ...................... | 260/45.95 |

FOREIGN PATENT DOCUMENTS 953112 3/1964 United Kingdom .
1298248 11/1972 United Kingdom .

OTHER PUBLICATIONS

Plastics Engineering, Sep. 1976, pp. 21–24.

*Primary Examiner*—V. P. Hoke
*Attorney, Agent, or Firm*—Luther A. R. Hall

[57] ABSTRACT

Use of symmetrical triarylphosphites of the general formula I

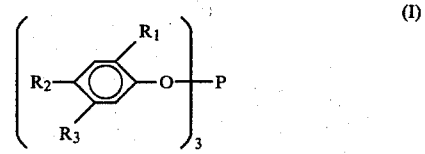

wherein
$R_1$ is tert.-butyl, 1,1-dimethylpropyl, cyclohexyl or phenyl, and one of
$R_2$ and $R_3$ is hydrogen and the other is hydrogen, methyl, tert.-butyl, 1,1-dimethylpropyl, cyclohexyl or phenyl, in combination with phenolic antioxidants for stabilizing organic polymers which contain hetero atoms, double bonds or aromatic rings.

10 Claims, No Drawings

STABILIZER SYSTEMS OF TRIARYLPHOSPHITES AND PHENOLS

This is a continuation of application Ser. No. 112,772, filed on Jan. 17, 1980, now abandoned; which in turn is a Continuation of application Ser. No. 904,917, filed on May 3, 1978, now abandoned; which in turn is a Continuation of application Ser. No. 762,918, filed on Jan. 27, 1977, now abandoned.

The present invention relates to the use of stabiliser systems of triarylphosphites and phenols for stabilising organic polymeric materials against thermooxidative deterioration, and to the organic polymers stabilised with the said systems.

"Triarylphosphites", or "phosphites containing aryl groups", are known. By "phosphites containing aryl groups" are meant, in particular, variably substituted (unsymmetrical) phosphites, i.e. those containing either three differently substituted aryl radicals or, besides (substituted) aryl radicals, also alkyl radicals. Such unsymmetrical phosphites undergo usually intermolecular transesterification reactions, are always liquid and have a tendency to hydrolyse, which results in poor storage stability and poorly reproducible effectiveness.

In U.S. Pat. No. 2,997,454 and U.S. Pat. No. 2,867,594, the greater effectiveness of unsymmetrical alkyl-arylphosphites in PVC compared with that of the symmetrical triarylphosphites is emphasised.

It has now been found that surprisingly a limited class of symmetrical triarylphosphites of the general formula I

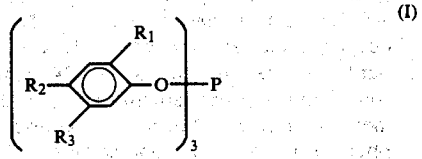

(I)

wherein $R_1$ is tert.-butyl, 1,1-dimethylpropyl, cyclohexyl or phenyl, and one of $R_2$ and $R_3$ is hydrogen and the other is hydrogen, methyl, tert.-butyl, 1,1-dimethylpropyl, cyclohexyl or phenyl, display, in combination with phenolic antioxidants, a particularly high degree of effectiveness in those organic polymers which contain hetero atoms, double bonds or aromatic rings.

The compounds of the formula I can be used—together with one or more of the phenolic compounds—either singly or in combination with each other. The phosphites usable according to the invention are generally crystallised solids which, compared with the wide range of the phosphites at present known, are also particularly stable against hydrolysis.

The symbols in the formula I preferably have the following meanings:

$R_1$ is tert.-butyl, and one of $R_2$ and $R_3$ is hydrogen and the other is hydrogen, methyl or tert.-butyl.

Particularly suitable compounds of the formula I are, e.g.:
tris-(2,5-ditert.-butylphenyl)-phosphite,
tris-(2-tert.-butylphenyl)-phosphite,
tris-(2-phenylphenyl)-phosphite,
tris-[2-(1,1-dimethylpropyl)-phenyl]-phosphite,
tris-[2,4-di-(1,1-dimethylpropyl)-phenyl]-phosphite,
tris-(2-cyclohexylphenyl)-phosphite,
tris-(2-tert.-butyl-4-phenylphenyl)-phosphite,
tris-(2-tert.-butyl-4-methylphenyl)-phosphite,
tris-(2,4-ditert.-amylphenyl)-phosphite or
tris-(2,4-ditert.-butylphenyl)-phosphite.

Examples of phenolic compounds to be mentioned are:

1. Single 2,6-disubstituted phenols, such as
2,6-di-tert.-butyl-4-methylphenol, 2,6-di-tert.-butyl-4-methoxymethylphenol, 2,6-di-tert.-butyl-4-methoxyphenol or 2,6-diphenyl-4-methoxyphenol.

2. Bisphenols such as
2,2'-methylene-bis-(6-tert.-butyl-4-methylphenol), 2,2'-methylene-bis-(6-tert.-butyl-4-ethylphenol), 2,2-methylene-bis-[4-methyl-6-(α-methylcyclohexyl)-phenol], 1,1-bis-(5-tert.-butyl-4-hydroxy-2-methylphenyl)-butane, 2,2'-methylene-bis-[4-methyl-6-cyclohexyl]-phenol, 2,2'-methylene-bis-[4-methyl-6-nonyl]-phenol, 1,1,3-tris-(5-tert.-butyl-4-hydroxy-2-methylphenyl)-butane, 2,2-bis-(5-tert.-butyl-4-hydroxy-2-methylphenyl)-4-n-dodecylmercapto-butane, 1,1,5,5-tetra-(5-tert.-butyl-4-hydroxy-2-methylphenyl)-pentane, ethylene glycol-bis-[3,3-bis-(3'-tert.-butyl-4'-hydroxyphenyl)-butyrate], 1,1-bis-(3,5-dimethyl-2-hydroxyphenyl)-3-(n-dodecylthio)-butane or 4,4'-thio-bis-(6-tert.-butyl-3-methylphenol).

3. Hydroxybenzyl compounds, such as
1,3,5-tris-(3,5-di-tert.-butyl-4-hydroxybenzyl)-2,4,6-trimethylbenzene, 2,2-bis-(3,5-di-tert.-butyl-4-hydroxybenzyl)-malonic acid-dioctadecyl ester, 1,3,5-tris-(3,5-di-tert.-butyl-4-hydroxybenzyl)-isocyanurate or 3,5-di-tert.-butyl-4-hydroxybenzyl-phosphonic acid-diethyl ester.

4. Amides of β-(3,5-di-tert.-butyl-4-hydroxyphenyl)-propionic acid, such as
1,3,5-tris-(3,5-di-tert.-butyl-4-hydroxyphenyl-propionyl)-hexahydro-s-triazine, N,N'-di-(3,5-di-tert.-butyl-4-hydroxyphenyl-propionyl)-hexamethylenediamine.

5. Esters of β-(3,5-di-tert.-butyl-4-hydroxyphenyl)-propionic acid with mono- or polyhydric alcohols, such as with
methanol, octadecanol, 1,6-hexanediol, ethylene glycol, thiodiethylene glycol, neopentyl glycol, pentaerythritol, tris-hydroxyethyl-isocyanurate.

6. Spiro compounds, such as
diphenolic spiro-diacetals or spiro-diketals, such as 2,4,8,10-tetraoxaspiro-[5,5]-undecane substituted in the 3- and 9-position with phenolic radicals, such as 3,9-bis-(3,5-di-tert.-butyl-4-hydroxyphenyl)-2,4,8,10-tetraoxaspiro-[5,5]-undecane, 3,9-bis-[1,1-dimethyl-2-(3,5-ditert.-butyl-4-hydroxyphenyl)-ethyl]-2,4,8,10-tetraoxaspiro-[5,5]-undecane.

Particularly preferred phenolic compounds are:
1,3,5-tris-(3,5-di-tert.-butyl-4-hydroxybenzyl)-2,4,6-trimethylbenzene,
pentaerythritol-tetra-[3-(3,5-di-tert.-butyl-4-hydroxyphenyl)-propionate],
β-(3,5-di-tert.-butyl-4-hydroxyphenyl)-propionic acid-n-octadecyl ester,
thiodiethylene glycol-β-[4-hydroxy-3,5-di-tert.-butylphenyl]-propionate.
2,6-di-tert.-butyl-4-methyl-phenol,
3,9-bis-[1,1-dimethyl-2-(3,5-di-tert.-butyl-4-hydroxyphenyl)-ethyl]-2,4,8-tetraoxaspiro-[5,5]-undecane, and
N,N'-di-(3,5-di-tert.-butyl-4-hydroxyphenylpropionyl)-hexamethylenediamine.

The compounds of the formula I can be produced by known methods, for example by reaction of a phenol of the formula II

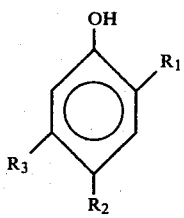

with phosphorus trichloride, without solvent, at 20°–250° C., or in an inert aprotic solvent in the presence of an organic base; or by reaction of a compound of the formula II with triphenylphosphite, preferably without solvent, in the present of a basic catalyst.

The resulting compounds are purified by recrystallisation in a suitable solvent (solvent mixture).

The stabiliser system according to the invention is suitable for stabilising those organic polymers which contain hetero atoms, double bonds or aromatic rings. The following are for example suitable:

1. polymers derived from doubly unsaturated hydrocarbons, e.g. polyisoprene or polybutandiene;
2. polystyrene;
3. copolymers of styrene or α-methyl styrene with dienes or acryl derivatives, such as styrene-butadiene, styrene-acrylonitrile, styrene-acrylonitrile-methacrylate, mixtures of high impact strength from styrene-copolymers and another polymer, such as polyacrylate, a diene-polymer or an ethylene-propylene-diene-terpolymer, as well as block copolymers of styrene such as styrene-butadiene-styrene, styrene-isoprene-styrene or styrene-ethylene/butylene-styrene;
4. graft polymers of styrene, such as styrene or polybutadiene, styrene and acrylonitrile on polybutadiene, as well as mixtures with the copolymers mentioned under (3), such as those known as so-called ABS polymers;
5. halogen-containing vinyl polymers, such as polyvinyl chloride, polyvinylidene chloride, polyvinyl fluoride, polychloroprene, chlorinated rubber, vinyl chloride/vinylidene chloride copolymers, vinyl chloride/vinyl acetate copolymers or vinylidene chloride/vinyl acetate copolymers;
6. polymers derived from α,β-unsaturated acids and derivatives thereof, polyacrylates and polymethacrylates, polyacrylic amides and polyacrylonitrile;
7. polymers derived from unsaturated alcohols or their acyl derivatives or acetals, such as polyvinyl alcohol, polyvinyl acetate, polyvinyl stearate, polyvinyl benzoate, polyvinyl butyral, polyallyl phthalate, polyallyl melamine and copolymers thereof with other vinyl compounds, such as ethylene/vinyl acetate copolymers;
8. polyacetals such as polyoxymethylene, and also those polyoxymethylenes containing as comonomers, e.g. ethylene oxide;
9. polyurethanes,
10. polycarbonates;
11. aliphatic and aromatic polyamides and copolyamide derived from diamines and dicarboxylic acids and/or from aminocarboxylic acids or the corresponding lactams, such as polyamide 6, polyamide 6/6, polyamide 6/10, polyamide 11 and polyamide 12;
12. polyesters derived from dicarboxylic acids and dialcohols and/or from hydroxycarboxylic acids or the corresponding lactones, such as polyethylene glycol terephthalate and poly-1,4-dimethylol-cyclohexaneterephthalate.

The stabiliser mixture according to the invention is incorporated at a concentration of 0.005% to 5%, preferably 0.01 to 1%, particularly preferably 0.05 to 0.5%, calculated on the material to be stabilised. The triarylphosphite and the phenolic antioxidant are incorporated in the ratio of 10:1 to 1:5, preferably 5:1 to 1:2, particularly 3:1 to 1:1. Incorporation can be effected by various methods, for example by dry mixing of the polymer with at least one of the compounds of the invention and a phenolic antioxidant, and subsequent processing in a kneading machine, mixing rolls or extruder. The additives mentioned can be applied also in the form of a solution or dispersion to the polymer, with the solvent being subsequently evaporated off.

The following may be mentioned as examples of further additives that can be used together with the combination according to the invention:

1. Aminoaryl derivatives, e.g.
phenyl-1-naphthylamine, phenyl-2-naphthylamine, N,N'-di-phenyl-p-phenylenediamine, N,N'-di-2-naphthyl-p-phenylenediamine, N,N'-di-2-naphthyl-p-phenylenediamine, N,N'-di-sec.-butyl-p-phenylenediamine, 6-ethoxy-2,2,4-trimethyl-1,2-dihydroquinoline, 6-dodecyl-2,2,4-trimethyl-1,2-dihydroquinoline, mono- and dioctyliniinodibenzyl, polymerised 2,2,4-trimethyl-1,2-dihydroquinoline.

Octylated diphenylamine, nonylated diphenylamine, N-phenyl-N'-cyclohexyl-p-phenylenediamine, N-phenyl-N'-isopropyl-p-phenylenediamine, N,N'-di-sec.octyl-p-phenylenediamine, N-phenyl-N'-sec.-octyl-p-phenylenediamine, N,N'-di-(1,4-dimethylpentyl)-p-phenylenediamine, N,N'-dimethyl-N,N'-di-(sec.-octyl)-p-phenylenediamine, 2,6-dimethyl-4-methoxyaniline, 4-ethoxy-N-sec.-butylaniline, diphenylamineacetone condensation product, aldol-1-naphthylamine and phenothiazine.

With the use of this group, discolouration effects have occasionally to be taken into account.

2. UV-Absorbers and light-stabilisine agents
2.1. 2-(2'-Hydroxyphenyl)-benzotriazoles, e.g. the 5'-methyl-, 3',5'-di-tert.-butyl-, 5'-tert.-butyl-, 5'-(1,1,3,3-tetramethylbutyl)-, 5-chloro-3',5'-di-tert.-butyl-, 5-chloro-3'-tert.-butyl-5'-methyl-, 3'-sec.-butyl-5'-tert.-butyl-, 3'-α-methylbenzyl-5'-methyl-, 3'-α-methylbenzyl-5'-methyl-5-chloro-, 4'-hydroxy-, 4'-methoxy-, 4'-octoxy-, 3',5'-di-tert.-amyl-, 3'-methyl-5'-carbomethoxyethyl- and 5-chloro-3',5'-di-tert.-amyl-derivative.

2.2. 2,4-bis-(2'-Hydroxyphenyl)-6-alkyl-s-triazines, e.g. the
6-ethyl-, 6-heptadecyl- or 6-undecyl-derivative.
2.3. 2-Hydroxybenzophenones, e.g. the
4-hydroxy-, 4-methoxy-, 4-octoxy-, 4-decyloxy-, 4-dodecyloxy-, 4-benzyloxy-, 4,2',4'-trihydroxy- or 2'-hydroxy-4,4'-dimethoxy-derivative.
2.4. 1,3-bis-(2'-Hydroxybenzoyl)-benzenes, e.g.
1,3-bis-(2'-hydroxy-4'-hexyloxy-benzoyl)-benzene, 1,3-bis-(2'-hydroxy-4'-octyloxy-benzoyl)-benzene or 1,3-bis-(2'-hydroxy-4'-dodecyloxy-benzoyl)-benzene.
2.5. Esters of optionally substituted benzoic acids, e.g.
phenylsalicylate, octylphenylsalicylate, dibenzoylresorcin, bis-(4-tert.-butylbenzoyl)-resorcin, benzoylresorcin, 3,5-di-tert.-butyl-4-hydroxybenzoic acid-2,4-ditert.-butylphenyl ester or -octadecyl ester or -2-methyl-4,6-di-tert.-butyl ester.

2.6. Acrylates, e.g.

α-cyano-β,β-diphenylacrylic acid-ethyl ester or -isooctyl ester, α-carbomethoxy-cinnamic acid methyl ester, α-cyano-β-methyl-p-methoxy-cinnamic acid methyl ester or -butyl ester or N-(β-carbomethoxyvinyl)-2-methyl-indoline.

2.7. Sterically hindered amines, e.g.

4-benzoyl-2,2,6,6-tetramethylpiperidine, 4-stearyloxy-2,2,6,6-tetramethylpiperidine, bis-(2,2,6,6-tetramethylpiperidyl)-sebacate or 3-n-octyl-7,7,9,9-tetramethyl-1,3,8-triaza-spiro[4,5]decane-2,4-dione.

2.8. Oxalic acid diamides, e.g.

4,4'-di-octyloxy-oxanilide, 2,2'-di-octyloxy-5,5'-di-tert.-butyl-oxanilide, 2,2'-di-dodecyloxy-5,5'-di-tert.-butyloxanilide, 2-ethoxy-2'-ethyl-oxanilide, N,N'-bis-(3-dimethylaminopropyl)-oxalamide, 2-ethoxy-5-tert.-butyl-2'-ethyloxanilide and the mixture thereof with 2-ethoxy-2'-ethyl-5,4'-di-tert.-butyl-oxanilide, or mixtures of ortho- and para-methoxy- as well as of o- and p-ethoxy-disubstituted oxanilides.

2.9. N-Cyclohexyl-thiophosphoric acid-O,O-di-(4-tert.-butylphenyl)-ester.

2.10. Co-dicyclohexyl-dithio-phosphinate.

3. Compounds breaking down peroxide, such as esters of β-thio-dipropionic acid, for example of lauryl, stearyl, myristyl or tridecyl esters, mercaptobenzimidazole, zinc salt of 2-mercaptobenzimidazole.

4. Polyamide stabilisers, such as copper salts in combination with iodides and/or phosphorus compounds and salts of bivalent manganese.

5. Basic co-stabilisers, such as melamine, benzoguanamine, polyvinylpyrrolidone, dicyanodiamide, triallylcyanurate, urea derivatives, hydrazine derivatives, amines, polyamides, polyurethanes, alkali metal salts and alkaline-earth metal salts of higher fatty acids, for example calcium stearate, zinc stearate, magnesium stearate, sodium ricinoleate, potassium palmitate, antimony brenzcatechinate or tin brenzcatechinate.

6. PVC Stabilisers, such as organic tin compounds, organic lead compounds and barium/cadmium salts of fatty acids.

7. Urea derivatives, such as N-cyclohexyl-N'-1-naphthylurea, N-phenyl-N,N'-dicyclohexylurea, N-phenyl-N'-2-naphthylurea, N-phenylthiourea and N,N'-dibutylthiourea.

8. Other additives, such as plasticisers, lubricants, emulsifiers, fillers, carbon black, asbestos, kaolin, talcum, glass fibers, pigments, optical brighteners, flameproofing agents and antistatic agents.

The invention is further illustrated by the following Examples.

EXAMPLE 1

100 parts of unstabilised SAN granulate (styrene/acrylonitrile copolymer containing 26.5% of acrylonitrile, "Ronfalin S", DSM, Holland) are mixed dry with 0.1 part of each of the additives given in Table 1. The mixtures are extruded in a Ko-kneader at 180° C. and subsequently granulated. The resulting granulate is injected at 240° C. in an injection extrusion machine (Ankerwerk Nurnberg, Germany) to form platelets 50×55×2 mm in size. The comparative platelets without additives are produced in an analogous manner.

The intensity of the yellowing produced by processing is determined by measurement of the Yellowness Index according to ASTM 1925.

TABLE 1

| Additive (in each case 0.1%) | Yellowness Index according to ASTM 1925 |
|---|---|
| None | 7.8 |
| A | 8.2 |
| A + B | 12.3 |
| A + C | 5.4 |

A: 3-(3,5-ditert.-butyl-4-hydroxyphenyl)-propionic acid-octadecyl ester;
B: distearyl-pentacrythritol-diphosphite;
C: tris-(2,4-ditert.-butylphenyl)-phosphite.

EXAMPLE 2

The solution of a polyurethane elastomer having the following composition
  90 parts of dimethylformamide,
  9.8 parts of polyurethane,
  0.2 part of TiO$_2$
was used for the following test.

The additives given below were added in the respective cases to the solution and subsequently stirred in for half an hour until completely dissolved:

(1) 0.1 part of additive D,
  (2) 0.1 part of additive D
     0.1 part of additive C,
  (3) 0.1 part of additive D
     0.05 part of additive E
     0.05 part of additive F,
  (4) 0.2 part of additive D,
     0.05 part of additive E,
     0.05 part of additive F,
     0.05 part of additive C,
  (5) control.

C: tris-(2,4-ditert.-butylphenyl)-phosphite;
D: pentacrythritol-tetra-[3-(3,5-ditert.-butyl-4-hydroxyphenyl]propionate;
E: 2-(2'-hydroxy-3',5'-ditert.-butylphenyl)-5-chlorobenzotriazole;
F: 3,5-ditert.-butyl-4-hydroxy-benzoic acid-2,4-ditert.-butylphenyl ester.

The solutions were spread with a film-spreading device onto a Teflon base and dried for 15 hours at 130° C. under high vacuum. The wet-film thickness was 500μ; the dried films accordingly had a thickness of about 50μ; and the additive was present at a concentration of 0.5 and 1.0%, respectively. The films were irradiated in an irradiation apparatus (Xenotest 1200) for 24 hours. The intensity of the visual yellow impression was determined, before and after irradiation, by measurement of the Yellowness Index according to ASTM 1925.

TABLE 2

| Test No. | Yellowness Index | |
|---|---|---|
| | before irradiation | after 24 hours Xenotest |
| 1 | 3.0 | 4.2 |
| 2 | 1.9 | 3.3 |
| 3 | 3.2 | 4.0 |
| 4 | 2.8 | 3.7 |
| 5 | 6.4 | 16.4 |

EXAMPLE 3

For the following test was used the solution of a polyurethane elastomer having the composition given below:

85 parts of dimethylacetamide,
15 parts of polyurethane.

The given additives were added in the respective cases to the solution and subsequently stirred in for half an hour until completely dissolved:
(1) 0.075 part of additive D,
(2) 0.075 part of additive D
   0.075 part of additive C,
(3) control.

The designations of the additives are the same as in Example 2.

The solutions were spread with a film-spreading device onto a Teflon base and dried for 15 hours at 130° C. under high vacuum. The wet-film thickness was 500μ; the dried films accordingly had a thickness of 50μ; and the additive was present at a concentration of 0.5%. The films were exposed in a standard apparatus according to AATCC, under controlled conditions, to the exhaust gases of a gas burner (so-called gas fading conditions, 1 cycle. 1 cycle signifies the exposure time until a control colouring jointly tested has changed to the colour of the colour-change standard). The intensity of the visual yellow impression was determined, before and after exposure to exhaust gases, by measurement of the Yellowness Index according to ASTM 1925.

TABLE 3

| Test No. | Yellowness Index | |
|---|---|---|
| | before exposure to gases | after 1 cycle of gas fading |
| 1 | 1.4 | 3.7 |
| 2 | 1.2 | 2.7 |
| 3 | 1.6 | 3.5 |

EXAMPLE 4

The solution of a polyacrylonitrile polymer having the following composition:
85 parts of dimethylformamide,
15 parts of polyacrylonitrile
was used for the following test.

The following additives were added to the solution in the manner indicated below, and subsequently stirred in for half an hour until completely dissolved:
(1) 0.030 part of additive D,
(2) 0.030 part of additive D
   0.075 part of additive C,
(3) control.

The designations of the additives are the same as in Example 2.

The solutions were added dropwise during 10 minutes, with vigorous stirring, to the double amount of cold water. The powder obtained was filtered off with suction, washed and dried. The additives were present at a concentration of 0.2% and 0.5%, respectively. The material was subsequently aged at three different temperatures for 4 hours in each case under normal nitrogen. The discoloration occuring during production and ageing was quantified by measurement of the Yellowness Index according to ASTM 1925.

TABLE 4

| Test No. | Yellowness Index | | | |
|---|---|---|---|---|
| | before ageing | 80° C. | 120° C. | 140° C. |
| 1 | 2.8 | 2.7 | 4.9 | 7.7 |
| 2 | 0.1 | 0.3 | 3.7 | 5.0 |
| 3 | 3.0 | 2.7 | 5.0 | 8.1 |

EXAMPLE 5

100 parts of unstabilised polyamide 12 granulate ("Vestamid", chem. Werke Huls, Germany) are mixed, after drying, with 0.5 part in each case of the additives listed in the following Table 5. The mixtures are extruded in a single screw extruder at a maximum of 240° C. and subsequently granulated. The granulate obtained is injected in an injection extrusion machine (Ankerwerk, Nurnberg, Germany) at a maximum temperature of 280° C. to form 1.5 mm thick specimens. The comparative specimens without additives are produced in an analogous manner.

The testing of the effectiveness of the additives contained in the specimens is carried out by heat ageing in an air-circulation furnace at 160° C. The progression of ageing is followed by determination of the stress-strain curves at intervals of 1–3 days. The end point is defined as being the time after which the yield stress has fallen to 80% of its initial value

TABLE 5

| Additive (in each case 0.5%) | Time until the yield stress has fallen to 80%, in days |
|---|---|
| none | 4.5 |
| D | 15.5 |
| D + C | 19.5 |

D: N,N'—hexamethylene-bis-[3-(3,5-ditert.-butyl-4-hydroxyphenyl)-propionamide];
C: tris-(2,4-ditert.-butylphenyl)-phosphite.

EXAMPLE 6

100 parts of impact resistant polystyrene (producer: BASF, Germany) are mixed with the additives listed in the following Table 6 at the given concentrations. The mixtures are extruded in a single screw extruder at a maximum of 180° C. and subsequently granulated. The granulate obtained is injected on an injection extrusion machine (Ankerwerk, Nurnberg, Germany) at a maximum of 240° C. to form 1.5 mm thick plates. The comparative plates without additives are produced in an analogous manner.

The effectiveness of the additives contained in the plates is tested by means of irradiation in a Xenotest apparatus, Type "150". The progression of ageing is followed by determination of the Yellowness Index according to ASTM 1925. The Yellowness Index constitutes a good criterion for the visual yellow impression.

TABLE 6

| Additive | Yellowness Index after Xenotest 150 (hours) | | |
|---|---|---|---|
| | 0 | 500 | 1000 |
| control | 14 | 8 | 12 |
| 0.25% H + 0.25% A | 12 | 7 | 10 |
| 0.25% I + 0.25% A | 35 | 14 | 17 |

H: tris-(2-tert.-butyl-4-methylphenyl)-phosphite,
I: tris-nonylphenyl-phosphite,
A: 3-(3,5-ditert.-butyl-4-hydroxyphenyl)-propionic acid-octadecyl ester.

We claim:
1. A stabilized composition consisting essentially of
   (a) a polymer which is polybutadiene, polyisoprene, polystyrene, a styrene copolymer, a styrene graft polymer, a halogen-containing vinyl polymer or copolymer, a polymer derived from an alpha,β-unsaturated acid, a polyacrylate, a polymethacrylate, a polyacrylic amide, polyacrylonitrile, a poly- mer derived from an unsaturated alcohol or its acyl or acetyl derivatives, a polyacetal, a polyurethane, a polycarbonate, a polyamide or a polyester, and (b) from 0.005 to 5% by weight of component (a) of a mixture of (1) a triaryl phosphite of the formula

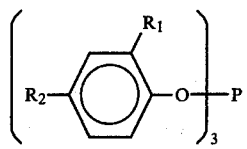

wherein $R_1$ represents tert-butyl or 1,1-dimethylpropyl, $R_2$ represents methyl, tert-butyl or 1,1-dimethylpropyl, and (2) a hindered phenolic antioxidant selected from the group consisting of 2,6-di-tert-butyl-4-methylphenol, 1,3,5-tris(3,5-di-tert-butyl-4-hydroxybenzyl) isocyanurate, n-octadecyl 3,5-di-tert-butyl-4-hydroxyhydrocinnamate, 1,3,5-tris-(3,5-di-tert-butyl-4-hydroxybenzyl)-2,4,6-trimethylbenzene, hexamethylene bis(3,5-di-tert-butyl-4-hydroxyhydrocinnamate), pentaerythrityl tetrakis(3,5-di-tert-butyl-4-hydroxyhydrocinnamate), 2,2'-methylene-bis(4-methyl-6-tert-butylphenol) and N,N'-hexamethylene-bis(3,5-di-tert-butyl-4-hydroxyhydrocinnamamide), with the ratio of the phosphite to antioxidant being 10:1 to 1:5.

2. A composition according to claim 1 wherein the polymer of component (a) is a polyacetal, a polycarbonate, a polyamide, polybutadiene, ethylene/vinyl acetate copolymer or styrene/acrylonitrile copolymer.

3. A composition according to claim 1 wherein the phosphite of component (b) is tris(2,4-di-tert-butylphenyl) phosphite or tris(2-tert-butyl-4-methylphenyl) phosphite.

4. A composition according to claim 3 wherein the phosphite of component (b) is tris(2,4-di-tert-butylphenyl) phosphite.

5. A composition according to claim 3 wherein the phosphite of component (b) is tris(2-tert-butyl-4-methylphenyl) phosphite.

6. A method of stabilizing a polymer (a) according to claim 1 which comprises incorporating into said polymer from 0.005 to 5% by weight, of said polymer, of a mixture (b) according to claim 1.

7. A method according to claim 6 wherein the polymer (a) is a polyacetal, a polycarbonate, a polyamide, polybutadiene, ethylene/vinyl acetate copolymer or styrene/acrylonitrile copolymer.

8. A method according to claim 6 wherein the mixture (b) contains as the phosphite, tris(2,4-di-tert-butylphenyl) phosphite or tris(2-tert-butyl-4-methylphenyl) phosphite.

9. A method according to claim 8 wherein the phosphite is tris(2,4-di-tert-butylphenyl) phosphite.

10. A method according to claim 8 wherein the phosphite is tris(2-tert-butyl-4-methylphenyl) phosphite.

* * * * *